United States Patent [19]

White

[11] Patent Number: 4,673,555

[45] Date of Patent: Jun. 16, 1987

[54] METHOD FOR PREPARATION OF DEFLUORINATED PHOSPHATE

[76] Inventor: Edward A. White, 2250 Greenfield Dr., Glenview, Ill. 60025

[21] Appl. No.: 641,443

[22] Filed: Aug. 16, 1984

[51] Int. Cl.⁴ ............................................. C01B 25/16
[52] U.S. Cl. .................................................... 423/167
[58] Field of Search ........................................ 423/167

[56] References Cited

U.S. PATENT DOCUMENTS

| | | | |
|---|---|---|---|
| 1,902,832 | 3/1933 | Caldwell | 423/167 |
| 2,143,865 | 1/1939 | Copson | 423/167 |
| 2,499,385 | 3/1950 | Hubbuch et al. | 423/167 |
| 2,795,484 | 6/1957 | Le Baron | 423/167 |
| 2,839,361 | 6/1958 | Hollingsworth et al. | 423/167 |
| 2,995,436 | 8/1961 | Hollingsworth et al. | 423/167 |
| 3,189,433 | 6/1965 | Hollingsworth et al. | 71/41 |
| 3,292,995 | 12/1966 | Allen | 423/167 |
| 3,364,008 | 1/1968 | Hollingsworth et al. | 423/167 |

Primary Examiner—John Doll
Assistant Examiner—Wayne A. Langel
Attorney, Agent, or Firm—Woodcock Washburn Kurtz Mackiewicz & Norris

[57] ABSTRACT

Phosphate rock is defluorinated by blending with phosphoric acid and a sodium defluorination reagent sufficient to give 5 to 9 percent $Na_2O$ based on the weight of rock and a mole ratio of CaO plus $Na_2O$ to $P_2O_5$ of 3.00, granulating the blend and introducing the blend into a fluidized bed calcination apparatus having at least a first and second reaction zone, each zone being maintained at a temperature above 1050° C., calcining the blend in the first zone in the presence of water vapor to remove a substantial portion of the fluorine from the blend and further calcining the blend in the subsequent zone or zones in an atmosphere containing sufficient air added in excess of that air required for combustion or water vapor instead of that air to reduce the fluorine content of the blend to a value of less than about 0.18 weight percent while maintaining the phosphorus to fluorine weight ratio in excess of about 100. The defluorinated phosphate is cooled and stored for use such as an animal feed supplement.

8 Claims, No Drawings

METHOD FOR PREPARATION OF DEFLUORINATED PHOSPHATE

BACKGROUND

This invention relates to the defluorination of phosphate rock and, more particularly, to the preparation of a defluorinated phosphate animal feed supplement from phosphate rock.

Defluorinated phosphate has found wide acceptance as a supplement for animal feed. Specifications for "defluorinated phosphate" or "feed grade tricalcium phosphate" which require a minimum of 18 weight percent phosphorus (P) content and a maximum of 0.18 weight percent fluorine (F) content have become standard within the industry. The weight ratio of phosphorus to fluorine, P/F weight ratio, is specified as greater than 100. This P/F weight ratio specification is a requirement for sale of defluorinated phosphate as an animal feed additive in many states of the United States.

A variety of processes have been suggested for thermal defluorination of phosphate rock to prepare defluorinated phosphate. Addition of one or more reagents in minor proportion to phosphate rock and heating to relatively high temperatures in the presence of water vapor are common features of processes described for thermal defluorination. The processes may be differentiated as to whether the product is in the molten or solid state as it leaves the furnace or calciner.

A disadvantage of processes which heat phosphate rock mixed with a reagent or reagents above the melting point is high unit energy consumption due to the high temperatures required. Unit energy consumption is the quantity of energy input per quantity of product output. A further disadvantage is the very corrosive effect of molten phosphate materials on furnace refractories. One such process is described by Hignett and Hubbuck, Ind. Eng. Chem., 38., 1208, 1946.

Processes which discharge the product from the calciner as a solid operate at lower temperatures than those that discharge the defluorinated product from the furnace as a melt. Because the temperature required for defluorination of phosphate rock is near the fusion point, objectionable sintering or fusion may occur if the temperature in the calciner inadvertently rises during calcination. Reagents such as $SiO_2$ or $Na_2O$ which aid defluorination also lower the melting point.

To allow defluorination without objectionable sintering and fusion, Hollingsworth, in U.S. Pat. No. 2,839,377 suggests control of the molar ratio of:

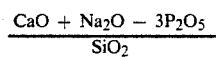

between the values 1.3 and 2.8 with addition of phosphoric acid and a sodium salt to allow calcination at a temperature of at least 2600° F. without substantial fusion. As a further improvement, Hollingsworth, in U.S. Pat. No. 2,995,436, describes forming porous nodules from a mixture containing phosphate rock having 2% to 6% silica content, 5% to 9% $Na_2O$ from soda ash and 7% to 11% $P_2O_5$ from phosphoric acid (based on the dry weight of the mixture) to allow complete defluorination by calcination without fusion at temperatures within the range 2500° to 2700° F. Hollingsworth describes additional improvement of the granulation technique for phosphate rock, phosphoric acid and soda ash in U.S. Pat. No. 3,189,433.

Amin, U.S. Pat. No. 3,852,493 suggests a modification of the composition and procedure of U.S. Pat. No. 2,995,436 to allow use of phosphate rock analyzing 74/73 BPL (BPL=% bone phosphate of lime or $Ca_3(PO_4)_2$ equivalent to $P_2O_5$ content of the rock) rather than phosphate rock analyzing over 75 BPL.

Hollingsworth and Snyder describe in U.S. Pat. No. 3,364,008 a technique of thin film defluorination in a fluid bed calciner. Non-agglomerated phosphate feed solids finer than minus 35 mesh are injected into a fluid bed of larger seed particles maintained at a temperature sufficient to cause the particles to stick together and as a consequence of physical contact between the feed particles and other particles in the fluid bed to agglomerate and thereby increase in size. The agglomerated particles are subjected to calcination and recovered as a defluorinated and agglomerated phosphate rock having a particle size appreciably larger than the non-agglomerated feed particles. Partial reaction may be effected before introduction of the non-agglomerated feed into a fluid bed for agglomeration and calcination. Agglomeration may also be effected in a fluid bed maintained at above 1000° F. before introduction into a second fluid bed for calcination.

Larson et al, in U.S. Pat. No. 4,101,636 describe the addition of a lime compound to phosphoric acid before the phosphoric acid is mixed with phosphate rock containing more than 6% acid insoluble impurities together with a sodium compound such as sodium carbonate before granulation followed by calcination in a fluid bed calciner at a temperature within the range of from about 980° to about 1350° C.

One disadvantage of the processes heretofore proposed for fluid bed calcination is the use of excessive quantities of energy in calcination. The aforementioned processes use only one state of calcination.

Two stages of calcination are described by Butts in U.S. Pat. No. 2,442,969. Phosphate rock is mixed in specified proportion with phosphoric acid and then calcined at 1100° to 1200° C. This calcined intermediate is then ground to minus 50 mesh and mixed with a basic material such as lime to obtain a specified mole ratio and then calcined a second time at about 1000° C. Butt suggests that about 20% of water may be added to the intermediate calcine-lime mix to facilitate the second calcining operation. However, grinding the intermediate and mixing with the basic material requires that the intermediate product be cooled to near ambient temperature. Since the material is calcined twice with intermediate cooling, unit energy consumption by this process is approximately doubled compared to single stage operation.

Hollingsworth, U.S. Pat. No. 2,562,718 also describes a two stage process in which a mixture of phosphoric acid and phosphate rock is calcined and then ground and mixed with lime and calcined a second time at a higher temperature. This two stage calcination also has approximately twice the energy consumption of a single stage calcination due to cooling the intermediate product to grind and mix with lime. In a subsequent disclosure, U.S. Pat. No. 2,556,541, Hollingsworth describes addition of lime to the material while it is in the kiln to enable calcination in a single pass or, alternately, in two or more passes through a shorter kiln with increasing hot zone temperatures in the succeeding passes.

Hollingsworth suggests that two stages of fluid bed calcination be used in U.S. Pat. No. 3,364,008. However, the preferable temperature in the first stage is about 1300° F., below the minimum stated by Hollingsworth to be required for defluorination. Thus, the first bed agglomerates rather than defluorinates.

OBJECTS OF THE INVENTION

It is an object of this invention to provide a method for manufacturing a phosphate product of low fluorine content.

It is another object of this invention to provide an improved method for producing a defluorinated phosphate animal feed supplement from phosphate rock.

Still another object of this invention is to provide an improved method of preparing defluorinated phosphate by a fluidized bed calciner technique.

A further object of the invention is to provide an improved method for preparing defluorinated phosphate employing reduced unit energy consumption.

Other objects will become apparent from a review of the instant specification.

SUMMARY OF THE INVENTION

It has now been discovered that the aforementioned objects are accomplished in a method for preparing defluorinated phosphate which comprises:
(a) forming a mixture of fluorine containing phosphate rock, phosphoric acid, and a sodium defluorinating reagent sufficient to give 5 to 9 percent $Na_2O$ based on the weight of the rock and a mole ratio of CaO plus $Na_2O$ to $P_2O_5$ of about 3.00 and, as desirable, water;
(b) granulating the resulting mixture;
(c) introducing the resulting granules (preferably continuously) into a fluidized bed calciner having a plurality of stages and bringing them to a temperature within the range of from about 1204° to about 1482° C. in the presence of water vapor and then conveying the partially defluorinated granules to a subsequent stage or to subsequent stages of the calciner wherein the granules are maintained at a temperature within the aforementioned temperature range in the presence of water vapor and thus further defluorinated until sufficient fluorine is evolved to produce defluorinated phosphate granules having a P/F weight ratio of at least about 100 and a phosphorus content of at least about 18 percent.

The resulting defluorinated phosphate granules are cooled and stored for use such as an animal feed supplement. If desired, the granules may be cooled by heat exchange with the fluidizing gas. Not only does the method produce a phosphate product of low fluorine content using the fluidized bed calciner technique, but it also reduces unit energy consumption in such production and increases bed productivity measured as mass of product output per unit area of fluidized bed.

DETAILED DESCRIPTION OF THE INVENTION

Fluorine-containing phosphate rock, phosphoric acid and a sodium alkali such as soda ash or caustic soda are mixed and granulated according to procedures known to those skilled in the art. The mole ratio of CaO plus $Na_2O$ to $P_2O_5$ in the mixture should be about 3.00. Fine material recovered from the calciner gases may also be incorporated into the feed to the granulation circuit. It is preferred to dry the granules before they are introduced into the fluidized bed calciner since water in the granules is removed with less expenditure of heat energy in a separate drying operation. Granules are then introduced into a multiple stage fluidized bed calciner. The stage in which the solids are first calcined is designated as the first stage; the stage in which the solids are next calcined following the first stage is designated the second stage; etc.

Fluidizing gas is caused to flow through a gas distributor into each stage at a suitable superficial velocity such as about 1.5 to 2.7 meters per second to maintain the granules in the fluidized condition. The fluidizing gas is air or a gas containing oxygen.

Fuel, such as gaseous or liquid fuel, is added to the fluidized bed in each stage and burned to maintain the stage at the temperature chosen for defluorination. Combustion of hydrogen contained in the fuel provides water vapor for defluorination. Steam may also be added to a stage or stages or to the fluidizing gas to increase the water vapor concentration in the gas in contact with the granules as needed or desired.

Individual streams of fluidizing gas preferably may be introduced through gas distributors to each stage of the multistage fluidized bed calciner. Fluidizing gases would leave the calciner from above each stage rather than being conducted through another stage. Solids flow from the first stage to the last stage, being contacted by fresh fluidizing gas in each stage. Flow of the gases is upward; movement of the solids is generally horizontal with such downward movement as is necessary for the fluidized solids to flow from stage to stage. This flow arrangement is designated as "parallel" flow.

Alternately, fluidizing gas may be introduced through a gas distributor to the last stage of the multistage fluidized bed calciner and flow from this last stage to the gas distributor of the next-to-last stage etc. The gas then leaves the calciner from above the first stage bed. In this case, flow of the gas is countercurrent to the movement of the granules. Most conveniently, the flow of the gas is upward while the movement of the granules from stage to stage is downward. This flow arrangement is designated as "series" flow.

"Parallel" or "series" flow of fluidizing gas and solids in multistage fluidized bed calcination may be accomplished by the various arrangements of components known to those skilled in the art. Several ways to provide multiple stages in fluidized beds are shown in FIGS. 20–87 of the Chemical Engineers' Handbook, 5th Edition, Perry and Chilton, McGraw-Hill, 1973 which book is incorporated herein by reference. Defluorination with the "series" arrangement of a multistage fluidized bed calciner is projected to have somewhat less unit energy consumption consumption compared to the "parallel" arrangement because gas from the lower stage of a series unit does not have to be heated before use as fluidizing gas in the upper stage or stages.

The gas distributors in all but the last stage of "series" units, however, are subjected to higher temperatures compared to those in "parallel" calciners when both are operating at the same defluorination temperatures. Fluidizing gas going to the gas distributors of "parallel" units is at ambient temperature or a temperature between ambient and the defluorination temperature, if pre-heated, while fluidizing gas going to the gas distributors of "series" units, except for the last stage, is at the defluorination temperature. Thus, the gas distributors of "parallel" units are cooler than those in all but the last stage of "series" units when operating at the same defluorination temperatures.

Similarly, the lower surfaces and gas passages of the gas distributors in "series" multistage fluidized bed calciners, except for the last stage, are in contact wih fluoride gases from the subsequent stage. These fluoride gases are not present in the fluidizing gas to gas distributors in "parallel" units. Dust containing phosphates is also present in the fluidizing gas to gas distributors in all but the last stage of "series" units. Dust containing phosphates is present in the gas to gas distributors in "parallel" units only if pre-heating of the fluidizing gas is effected by contact with the calcined product.

Fluoride gases tend to be corrosive to refractories at the high temperatures required for defluorination. Solids containing phosphates also tend to have a fluxing action on refractories at defluorination temperatures. Because of higher temperature, fluoride gases and dust, refractories in gas distributors for "series" multistage fluidized bed calciners would tend to have shorter service life compared to refractories in gas distributors for "parallel" units. For the same reasons, calciner walls below the gas distributors in "series" units, except for those in the last stage, would also tend to have shorter service life compared to those in "parallel" units.

While the "series" configuration of multistage fluidized bed calciner has an advantage in unit energy consumption, the "parallel" configuration is preferred because of the longer service life of its refractories. The increased costs for refractories in the "series" configuration tend to outweigh savings in fuel costs at present prices for fuel and refractories. Future advances in the art of fabrication of refractories may improve service life in the "series" configuration and thus make the "series" configuration economically preferable. Future changes in the prices of fuel and refractories may also make the series configuration economically preferable.

If preferred, the fluidizing gas may be preheated by heat exchange with the defluorinated product from the last stage of the fluidized bed calciner in a separate fluidized bed. This arrangement reduces unit energy consumption in defluorination and the cooling load for the product. It increases the amount of apparatus required, however, and adds phosphate-containing dust to the fluidizing gas.

A number of variables obtain in continuous fluidized bed calcination. These include, not necessarily in order of their importance: temperature, gas velocity, gas composition, ratio of gas throughput to solids throughput and bed depth. The required values of these variables for efficient defluorination will vary somewhat with variations in the feed to the calciner. Feed variables that may have an effect include composition, particle size, shape and porosity.

It is known that an increase in temperature generally improves defluorination. Typically, defluorination is carried out at the highest temperature that does not give rise to fusion or sintering of the solids that interfere with the operation of the calciner. It is also known that the presence of some amount of water vapor in the calciner also improves defluorination. "Improves" in relation to defluorination should be construed to mean increased output of product meeting specifications from a given calciner, reduced unit fuel consumption in calcination, reduced fluorine content in the product or combinations of these.

Since superficial gas velocity in a fluid bed calciner must be held within fairly narrow limits, the throughput for a given continuous unit depends primarily upon the ratio of fluidizing gas to solids. At a fixed value of superficial fluidizing gas velocity, the throughput depends exactly on the ratio of fluidizing gas to solids.

It has been found that the ratio of fluidizing gas to solids for defluorination in a continuous fluidized bed calciner depends on the temperature in the bed, the concentration of water vapor in the gas and the composition and characteristics of the feed solids. This can be demonstrated in the following non-limiting examples.

EXAMPLE 1

A continuous single stage fluidized bed calciner can be operated with natural gas burned in the bed with 5 percent excess air. The natural gas contains primarily methane and is referred to hereinafter as methane. The superficial velocity of the fluidizing gas is maintained at 2.2 meters per second. Granulated feed dried to contain about 2 weight percent moisture is fed to the bed at a rate to maintain the bed at 1427° C. The production rate from the bed is 597 kilograms per hour per square meter of bed. This rate includes dust recovered from the fluidizing gases. The product, however, contains 0.36 weight percent fluorine and does not meet the specification for fluorine content. The gases from the bed contain 18.7 volume percent water vapor and 1.90 volume percent fluorine as HF. Methane consumption is 8.36 gram moles per kilogram of product. The gas to solids ratio is 95.1 gram moles per kilogram of product. Air to the bed contains 1 volume percent water vapor.

EXAMPLE 2

The fluidized bed of Example 1 can be operated at a reduced feed rate and with increased excess combustion air to maintain the bed at 1427° C. and to obtain a product containing 0.16 weight percent F and 18.1 percent phosphorus. This product does meet specifications for fluorine and phosphorus content. The superficial velocity of the fluidizing gas is maintained at 2.2 meters per second as before. The production rate is reduced to 348 kilograms per hour per square meter of bed as compared to 597 before.

The gases from the bed contain 16.5 volume percent water vapor and 1.18 volume percent fluorine as HF. The excess combustion air is increased to 22.2 percent from 5 percent. Methane consumption increases to 12.59 gram moles per kilogram of product from 8.36. The gas to solids ratio increases to 163.0 gram moles of gas per kilogram of product from 95.1 gram moles of gas per kilogram of product.

EXAMPLE 3

The fluidized bed of Examples 1 and 2 can be operated at a reduced feed rate at 1407° C. Combustion air is supplied to maintain a 5 percent excess over that required for combustion of methane. Steam is added to the bed to increase the ratio of gas to solids and to increase the concentration of water vapor in the fluidizing gas to obtain a product containing 0.16 weight percent F and 18.1 percent phosphorus. The superficial velocity of the fluidizing gas is maintained at 2.2 meters per second as in Examples 1 and 2. The production rate is 356 kilograms per hour per square meter of bed.

The gases from the bed contain 28.7 volume percent water vapor and 1.20 volume percent F as HF. Steam addition is 19.6 gram moles of steam per kilogram of product. Methane consumption is 12.37 gram moles per kilogram of product. The gas to solids ratio is 159.3 gram moles per kilogram of product.

Comparison of Examples 1 and 2 shows that an increase in the gas to solids ratio, a reduction in the F concentration in the gas, is necessary to obtain 0.16 weight percent F in the product. The fluorine concentration in the gas to obtain specification product is reduced by air addition to 1.18 volume percent as HF with 16.5 percent water vapor from 1.9 percent HF with 18.7 percent water vapor.

Comparison of Examples 2 and 3 shows that reduction of the temperature of defluorination requires an increase in the water vapor concentration in the gas to obtain a 0.16 percent F concentration in the product. The fluorine concentration in the gas in Example 3 is 1.20 volume percent F as HF versus 1.18 in Example 2. The water vapor concentration in the gas in Example 3, however, is 28.7 volume percent versus 16.5 volume percent in Example 2.

From examination of the examples above and other results of fluidized bed defluorination, I have discovered that the fluorine in the solid, probably as fluorapatite, $Ca_5F(PO_4)_3$, acts as if it were in equilibrium with the water vapor and HF in the gaseous phase. The reaction for the conversion of fluorapatite to calcium phosphate has been written as:

$$2Ca_5F(PO_4)_3 + H_2O + SiO_2 = 3Ca_3(PO_4)_3 + CaSiO_3 + 2HF$$

by Hignett and Hubbuck. I have found that extent of reaction in the fluidized bed calciner between the gas phase components and the fluorine in the solid appears to be correlated by:

$$(pHF)^2/(pH_2O)(F) = k$$

$pHF$ = mole fraction of HF in the gas
$pH_2O$ = mole fraction of $H_2O$ in the gas
$F$ = mole fraction of F in the solid
$k$ = a constant for a given temperature, feed and fluidization condition While the constant, "k", resembles the equilibrium constant for the reaction of water vapor, fluorapatite and silica, it is an empirical factor derived from the results of continuous fluidized bed defluorination.

An approximate relationship between temperature and an equilibrium constant predicted by chemical thermodynamics is:

$$A + CT = -RT Ln k_p$$

where:
A,C = constants;
R = the gas constant R in PV=nRT;
T = absolute temperature.
$Ln k_p$ = natural logarithm of the equilibrium constant, $k_p$ Although the derivation of "k" is empirical, this relationship appears to correlate the effect of temperature upon the constant, "k". The values found from correlating the data from experiments in continuous fluidized bed defluorination were:

A = 93.92 calories per gram mole
C = −0.05081 calories per gram mole per degreee Kelvin While I do not wish to be bound by the correlations above, the following examples are projected using the relationships among the several factors described by the correlations.

EXAMPLE 4

The results from a two stage parallel fluidized bed calciner with air addition are projected. The first stage contains about 90 percent of the bed area; the second stage about 10 percent of the bed area. Solids flow from the first stage to the second stage. Two wind boxes operate separately to deliver fluidizing gas to the beds. Both beds operate with the superficial gas velocity at 2.2 meters per second and the temperature in both beds at 1427° C.

Methane burns in the first stage with 5.2 percent excess air. The first stage bed operates essentially as in the first example. The ratio of gas to solids is slightly higher, 95.7 gram moles per kilogram of product versus 95. Fluorine content of the product is projected as 0.36 weight percent. Water vapor content is 18.7 volume percent with 1.9 volume percent F as HF. Methane consumption in the first of the beds is 8.40 gram moles per kilogram of product.

The second stage bed operates to yield a product containing 0.16 weight percent fluorine. Excess air is 52.8 percent. Water vapor content is 13.0 volume percent with 1.05 volume percent F as HF. Methane consumption in the stage is 0.61 gram moles per kilogram of solids. The gas to solids ratio in the second stage is 9.71 gram moles of gas per kilogram of solids.

Total methane consumption in the two stages is 9.01 gram moles per kilogram of product. The production rate is 538 kilograms per square meter of bed in the two stages.

EXAMPLE 5

The results are projected for a two stage parallel fluid bed calciner operated with steam added to the second stage rather than air being added in addition to that required for 5 percent excess combustion air. Methane burns in the second stage with 5 percent excess combustion air. Conditions in the first stage, temperature, superficial gas velocity, gas to solids ratio and fluorine content of the product are as described in Example 4.

Operation of the second stage with steam addition to yield a product containing 0.16 percent F requires changing proportioning of fluidizing gas to the stages so that about 94.3 percent of the bed area is in the first stage and about 5.7 percent is in the second stage.

Steam addition in the second stage is 1.43 gram moles per kilogram of product. This results in a water vapor concentration in the second stage of 38.0 volume percent and a F concentration as HF of 1.79 volume percent. Gas to solids ratio in the second stage is 5.73 gram moles per kilogram of product. Methane consumption in the second stage is 0.38 gram moles per kilogram of product. Production rate in the two-stage bed with steam addition in the second stage is 560 kilograms per hour per square meter of bed.

Results in the single stage operation and the projected two-stage operations with air and with steam addition are compared in the tabulation below.

|  | One-Stage Air Ad'n | Two-Stage Air Ad'n | Two-Stage Steam Ad'n |
|---|---|---|---|
| Product F content, weight percent | 0.16 | 0.16 | 0.16 |
| Methane consumption, | 12.59 | 9.01 | 8.78 |

|  | One-Stage Air Ad'n | Two-Stage Air Ad'n | Two-Stage Steam Ad'n |
| --- | --- | --- | --- |
| g-moles/kg product | | | |
| Bed productivity, Kg. product/hr. sq. m. | 348 | 538 | 560 |

EXAMPLE 6

Results were projected for a single stage fluidized bed calciner operating with the fluidizing air preheated by contact with the defluorinated product in a separate fluidized bed.

The fluidized bed calciner operates at 1427° C. with a superficial gas velocity of 2.2 meters per second as in the preceding examples. The rate of the granulated feed solids and the methane rate were projected to give a defluorinated product containing 0.16 weight percent F.

The temperature of the pre-heated combustion air was 288° C. The percentage of excess combustion air was 42.8 percent. The gases from the bed contained 14.4 volume percent water vapor and 1.17 volume percent F as HF. Methane consumption was 11.66 gram moles per kilogram of product. The gas to solids ratio was 174.2 gram moles per kilogram of product. The production rate from the bed was 326 kilograms per hour per square meter of bed.

Preheating the combustion air for a single-stage fluidized bed reduces methane consumption to 11.66 gram moles per kilogram of product from 12.59. The production rate of the bed, however, is reduced to 326 kilograms per hour per square meter from 348 kilograms per hour per square meter.

EXAMPLE 7

Results were projected for a parallel two-stage fluidized bed calciner with the combustion air for both stages pre-heated by heat exchange with the defluorinated product in a fluidized bed. The projections were made for the two-stage fluidized bed calciner operating with pre-heated air in two modes.

In the first mode, the excess combustion air in the second stage is increased to over 5 percent to bring the product F content to 0.16 weight percent. In the second mode, steam is added to the fluidizing gas in the second stage to bring the product F content to 0.16 percent. Both projections were made for a bed temperature of 1427° C. and a superficial gas velocity of 2.2 meters per second in both stages, as in the preceding example. Methane burns in the first stage in both modes with 5 percent excess combustion air.

Results of the projections with air addition and with steam addition are tabulated below for each stage in each mode.

| Stage and Mode | 1st Air | 2nd Air | 1st Steam | 2nd Steam |
| --- | --- | --- | --- | --- |
| Fluorine content of product, wt. % | 0.65 | 0.16 | 0.72 | 0.16 |
| Air pre-heat temp., °C. | 458 | 458 | 561 | 561 |
| Percent of bed area | 69 | 31 | 79 | 21 |
| Methane consumption, g-moles/kg. | 5.40 | 1.32 | 4.94 | 0.83 |
| Air or steam added, g-moles/kg. | 0 | 13.4 | 0 | 5.40 |
| Water vapor content of gas, mole % | 18.7 | 9.84 | 20.3 | 47.2 |
| F content of gas as HF, mole % | 2.66 | 0.91 | 2.85 | 1.99 |
| Gas-solids ratio, g-moles/kg. | 62.3 | 28.3 | 56.9 | 14.8 |

Single-stage and two-stage operation with pre-heated combustion air are compared in the table below:

|  | One-Stage Air Ad'n | Two-Stage Air Ad'n | Two-Stage Steam Ad'n |
| --- | --- | --- | --- |
| Product F content, Weight percent | 0.16 | 0.16 | 0.16 |
| Methane consumption, g-moles/kg. | 11.66 | 6.72 | 5.77 |
| Air pre-heat temp., °C. | 288 | 458 | 561 |
| Bed productivity, Kg./hr. sq. m. | 326 | 627 | 791 |

Other configurations of fluidized bed calciners with a plurality of stages may be used. For example, the granulated feed may be brought to a temperature below the final defluorination temperature in the first stage, brought to the final defluorination temperature in the second stage and then defluorinated to the final product fluorine content at the final defluorination temperature in a third stage. Other combinations of temperatures and number of stages may be used.

A plurality of stages may also be accomplished by the use of a cross flow configuration of fluidized bed. In this, the feed is introduced at one end of a more or less rectangular fluidized bed calciner having a relatively large ratio of length to width so that back-mixing of the solids in the fluidized bed does not occur to a substantial extent. Discharge of the solids occurs at the end opposite the end where the feed is introduced.

Air for fluidizing the bed and for combustion, at ambient temperature or pre-heated by contact with the defluorinated solids, is introduced through one or more gas distributors throughout the bed. Fuel is introduced at different rates along the length of the bed to bring the bed to the selected defluorination temperature or temperatures and maintain it at that temperature or temperatures. Steam may be added in the cross-flow bed since it improves defluorination when added under the proper circumstances. The points of addition should be adjusted for improved defluorination. When added, steam would substitute for part of the fluidizing air. The examples above indicate that steam addition is most effective in reducing fuel consumption and increasing bed productivity when it added as part of the fluidizing gas in a continuous defluorination process after the solids have been heated to the selected defluorination temperature in a previous stage.

Although this invention has been described in relation to specific embodiments, it will be apparent that obvious modifications may be made by one skilled in the art without departing from the intended scope of the invention as defined by the appended claims.

I claim:

1. A method for reducing the fluorine content of phosphate rock comprising:
   blending the rock with water and an amount of phosphoric acid and a sodium defluorinating reagent sufficient to give 5 to 9 percent $Na_2O$ based on the weight of the rock and a mole ratio of CaO plus $Na_2O$ to $P_2O_5$ of about 3;

introducing the blend into a fluidized bed calcination apparatus having at least a first and second reaction zone, each of said zones being at a temperature above about 1050° C.;

calcining the blend in the first zone in the presence of water vapor or optionally air and water vapor to remove a major proportion of the fluorine from the blend, and further calcining the blend in the subsequent zone or zones without substantial cooling of the blend between the first zone and the subsequent zone, said further calcining being carried out in the presence of water vapor and in an atmosphere containing air added in an amount in excess of that required for combustion and in excess, on a percentage basis, of that present in the first zone, said amount being sufficient to reduce the fluorine content of the blend to a value of less than about 0.18 weight percent while maintaining the phosphorus to fluorine weight ratio in excess of about 100.

2. The method of claim 1 wherein said sodium defluorinating reagent is selected from the carbonates, hydroxide and oxide of sodium.

3. The method of claim 1 wherein water vapor is substituted for air added in excess of that required for combustion so as to maintain a water vapor content in the atmosphere in excess of about 18 percent by volume.

4. The method of claim 1 wherein the moisture content of the blend is adjusted prior to calcination to below about 6 percent by weight.

5. The method of claim 1 wherein the temperature of the subsequent zones is maintained at a higher level than that of the first zone.

6. The method in accordance with claim 1 wherein the blend after removal from the subsequent zones is contacted with air employed for fluidizing the blend in the fluidized bed calcination apparatus to preheat the fluidizing air to a temperature greater than 25° C.

7. The method in accordance with claim 1 wherein the temperatures of the fluidized bed calcination apparatus zones are maintained between about 1200° and 1500° C.

8. The method of claim 1 further comprising the step of granulating said blend prior to the introduction step.

* * * * *